US008881108B2

(12) United States Patent
Tran

(10) Patent No.: US 8,881,108 B2
(45) Date of Patent: Nov. 4, 2014

(54) TEST PROGRAM FOR HTTP-COMMUNICATING SERVICE

(75) Inventor: Duong-Han Tran, Bad Schoenborn (DE)

(73) Assignee: SAP AG, Walldorf (DE)

( * ) Notice: Subject to any disclaimer, the term of this patent is extended or adjusted under 35 U.S.C. 154(b) by 187 days.

(21) Appl. No.: 13/535,562

(22) Filed: Jun. 28, 2012

(65) Prior Publication Data

US 2014/0007055 A1    Jan. 2, 2014

(51) Int. Cl.
| G06F 11/00 | (2006.01) |
| H04L 12/26 | (2006.01) |
| G06F 17/28 | (2006.01) |
| G06F 15/16 | (2006.01) |
| G06F 9/44 | (2006.01) |
| G06F 3/00 | (2006.01) |

(52) U.S. Cl.
USPC ............... 717/124; 370/241; 704/8; 709/203; 709/219; 709/223; 709/224; 709/230; 714/38.1; 717/127; 719/313

(58) Field of Classification Search
CPC ..... G06F 8/60; G06F 9/4448; G06F 11/3688; G06F 11/2294; G06F 11/3414; G06F 11/3457; G06F 11/3664; G06F 11/3672; G06F 11/3692; G06F 11/3696; G06F 11/3089; G06F 17/30867; G06F 11/30899; G06F 2201/875; H04L 43/50; H04L 67/02; H04L 12/2697
See application file for complete search history.

(56) References Cited

U.S. PATENT DOCUMENTS

| 6,138,157 | A  | * | 10/2000 | Welter et al. ................ 709/224 |
| 6,601,020 | B1 | * | 7/2003  | Myers ........................ 702/186 |
| 6,631,408 | B1 | * | 10/2003 | Welter et al. ................ 709/223 |
| 6,662,217 | B1 | * | 12/2003 | Godfrey et al. .............. 719/313 |
| 7,047,277 | B1 | * | 5/2006  | Welter et al. ................ 709/203 |
| 2004/0243338 | A1 | * | 12/2004 | Sabiers et al. .............. 702/122 |
| 2005/0267976 | A1 | * | 12/2005 | Chang et al. ................ 709/230 |
| 2007/0180325 | A1 | * | 8/2007  | Bailey et al. ................. 714/38 |
| 2008/0008101 | A1 | * | 1/2008  | Yamaoka et al. ............ 370/241 |
| 2009/0055801 | A1 | * | 2/2009  | Kodaka et al. .............. 717/124 |
| 2009/0248396 | A1 | * | 10/2009 | Fujiwara et al. ................ 704/8 |
| 2012/0174075 | A1 | * | 7/2012  | Carteri et al. ............... 717/127 |
| 2013/0055028 | A1 | * | 2/2013  | Patil et al. .................. 714/38.1 |
| 2013/0227078 | A1 | * | 8/2013  | Wei et al. .................... 709/219 |

OTHER PUBLICATIONS

'Hypertext transfer protocol' [online]. Wikipedia, 2011, [retrieved on Jun. 29, 2012]. Retrieved from the Internet: <URL: http://en.wikipedia.org/w/index.php?title=Hypertext_Transfer_Protocol&oldid=439381001>, 8 pages.

(Continued)

*Primary Examiner* — Don Wong
*Assistant Examiner* — Anibal Rivera
(74) *Attorney, Agent, or Firm* — Fish & Richardson P.C.

(57) ABSTRACT

This application relates to a computer-implemented method for testing an HTTP-communicating service. The method includes installing a service in a first system. The first system makes the service available to a second system for access using an HTTP request. The method includes installing a test program in the first system. The method also includes testing the installed service using the test program. The HTTP request is generated by the test program and received by the installed service. The method also includes presenting a result of the testing.

14 Claims, 6 Drawing Sheets

(56) References Cited

OTHER PUBLICATIONS

'SAP Netweaver' [online] Wikipedia, 2011, [retrieved on Jun. 29, 2012]. Retrieved from the Internet: <URL: http://en.wikipedia.org/w/index.php?title=SAP_NetWeaver&oldid=438247792>, 3 pages.

'Microsoft share point' [online] Wikipedia, 2011, [retrieved on Jun. 29, 2012]. Retrieved from the Internet: <URL: http://en.wikipedia.org/w/index.php?title=Microsoft_SharePoint&oldid=438861859>, 9 pages.

* cited by examiner

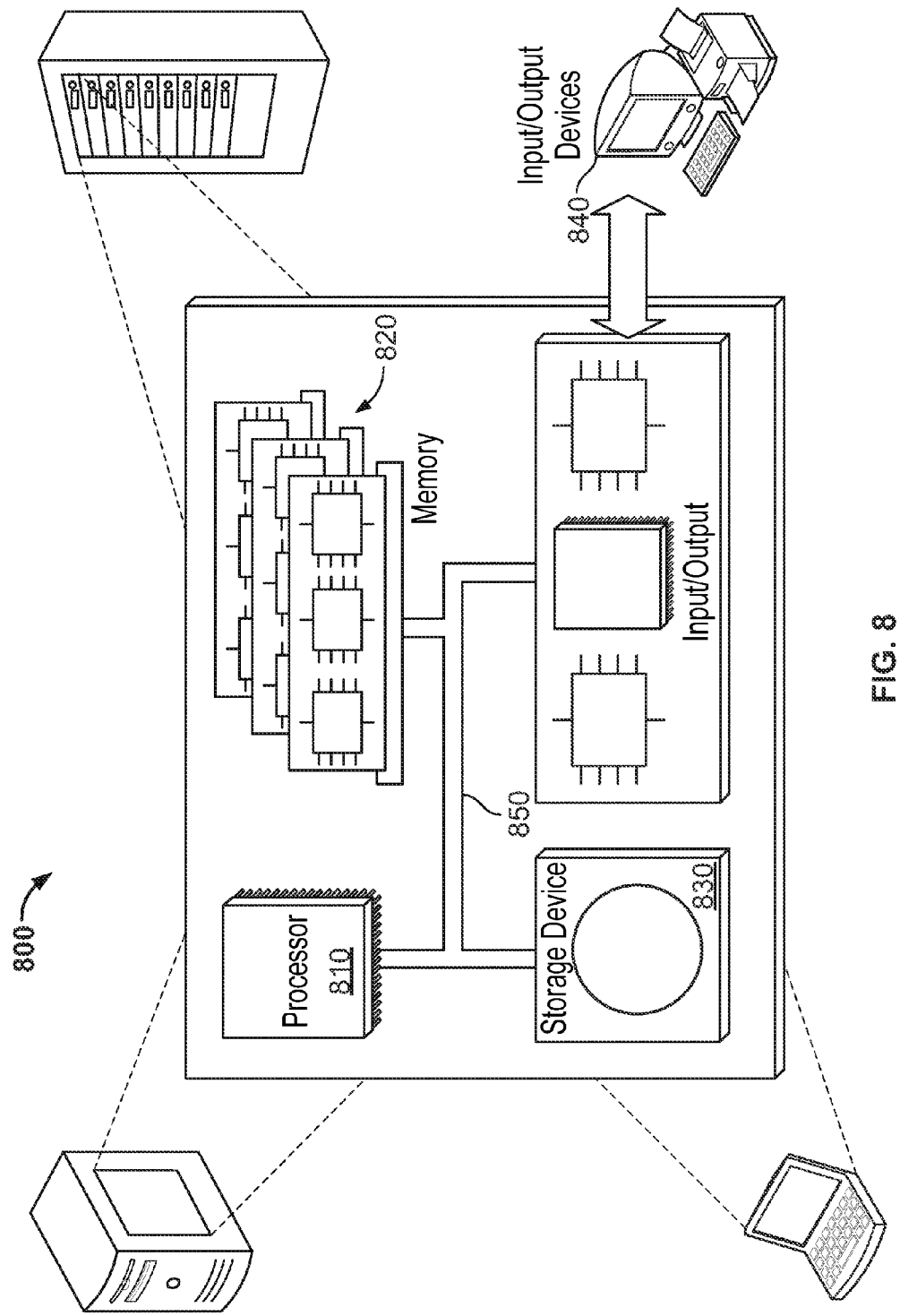

TEST PROGRAM FOR HTTP-COMMUNICATING SERVICE

BACKGROUND

Some applications, for example those that run in enterprise resource planning (ERP) systems, are configured so that they can be called from a mobile device, such as a smartphone. Such implementations can use hypertext transfer protocol (HTTP), so that the connection into the ERP system is device independent and can be used by different (mobile) devices.

A developer creating an application often needs to test the application one or more times to ensure its functionality. When the application is one that should be accessed by HTTP from a mobile device, it can be difficult for the developer to arrange that situation at his or her current working location, such as in an integrated development environment (IDE). For example, the developer should then first obtain a compatible mobile device (e.g., a smartphone), and ensure that the smartphone and the application can connect, often despite the presence of firewalls, routers, etc., between the mobile device and the user's local machine.

SUMMARY

In a first aspect, a computer-implemented method for testing an HTTP-communicating service includes: installing a service in a first system, the first system making the service available to a second system for access using an HTTP request; installing a test program in the first system; testing the installed service using the test program, wherein the HTTP request is generated by the test program and received by the installed service; and presenting a result of the testing.

In a second aspect, a computer program product is tangibly embodied in a computer-readable storage medium and includes instructions that when executed by a processor perform a method for testing an HTTP-communicating service. The method includes: installing a service in a first system, the first system making the service available to a second system for access using an HTTP request; installing a test program in the first system; testing the installed service using the test program, wherein the HTTP request is generated by the test program and received by the installed service; and presenting a result of the testing.

In a third aspect, a system includes: one or more processors; and a computer program product comprising instructions that when executed cause a method for testing an HTTP-communicating service to be performed. The method includes: installing a service in a first system, the first system making the service available to a second system for access using an HTTP request; installing a test program in the first system; testing the installed service using the test program, wherein the HTTP request is generated by the test program and received by the installed service; and presenting a result of the testing.

Implementations can include any or all of the following features. Testing the installed service includes specifying, in the HTTP request, an HTTP method and a data source, and wherein the installed service is performed using information from the HTTP request. Specifying the data source includes identifying a local data storage location. Testing the installed service includes reproducing, using the test application, an error situation that was previously detected when the HTTP request was submitted by the second system. Testing the installed service includes simulating the installed service. The method further includes storing, in the first system, a test case that uses underlying data stored at a local data storage location. The method further includes providing the test case from the first system to a third system, wherein the third system runs the test case without using the underlying data stored at the local data storage location.

Implementations can provide any or all of the following advantages. Testing of applications by HTTP communication can be made more efficient. Error situations can be reproduced without using the particular device that was involved. Test cases can be stored and shared with another system without exposing underlying test data.

The details of one or more implementations are set forth in the accompanying drawings and the description below. Other features and advantages will be apparent from the description and drawings, and from the claims.

DESCRIPTION OF DRAWINGS

FIG. 8 is a block diagram of a computing system that can be used in connection with computer-implemented methods described in this document.

Like reference symbols in the various drawings indicate like elements.

DETAILED DESCRIPTION

This document describes systems and techniques for testing an HTTP-communicating service. A testing application can be installed in a local system and there used for generating a HTTP request to a service (or other functionality) also located in the local system. Particularly, the testing application can generate the HTTP request as a way of testing the local functionality without using the specific remote device (e.g., a mobile device) and the specific remote connection (e.g., through a firewall and router).

Figure 1:
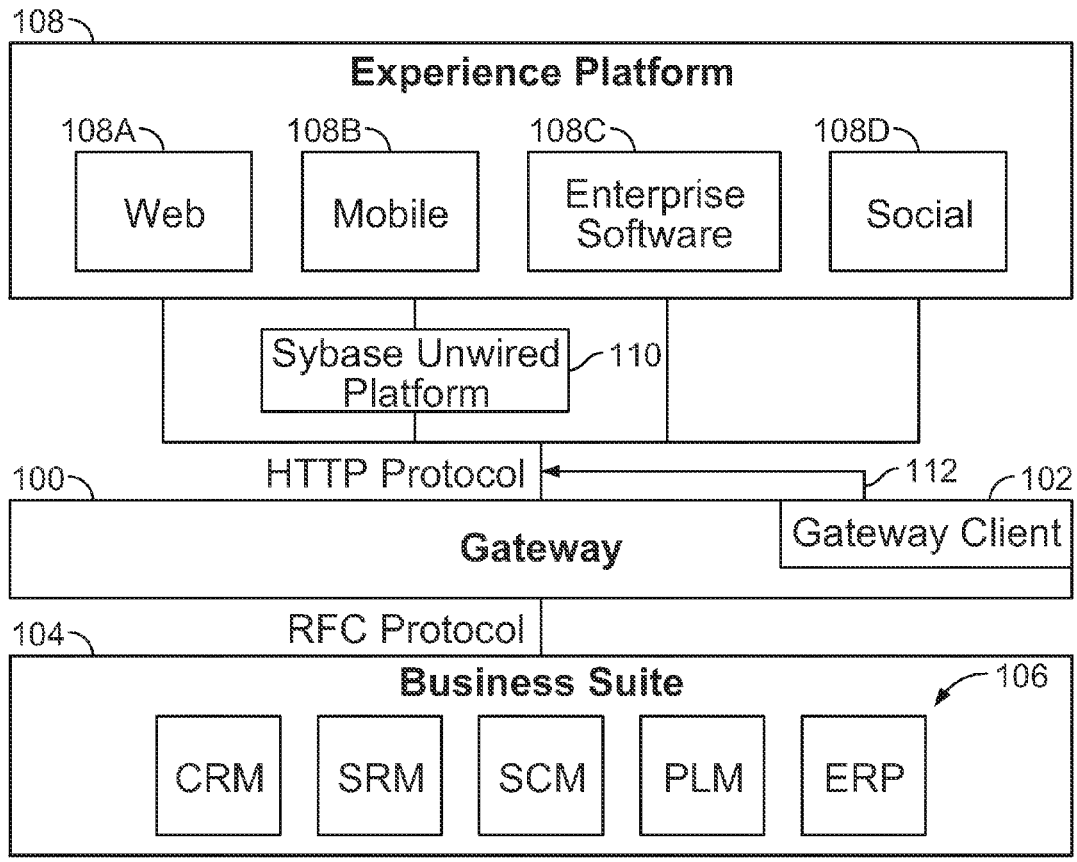
FIG. 1 shows an example of a gateway system with a gateway client.

FIG. 1 shows an example of a gateway system 100 with a gateway client 102. Particularly, the gateway system 100 is implemented as a way of adapting the use of, and increasing the flexibility in connecting with, a business suite system 104. Applications 104 included in the business suite system can relate to, but are not limited to, customer relationship management (CRM), storage resource management (SRM), supply chain management (SCM), product lifecycle management (PLM), or ERP in general, to name just a few examples. The gateway system and the business suite system can communicate with each other using any suitable protocol, including, but not limited to, remote function call (RFC) protocol.

In some implementations, the gateway system 100 can be considered a hub system and the business suite system 104 can be considered a backend system. For example, the gateway system can be the SAP NetWeaver Gateway system version 7.02, and the business suite system can be an advanced business system application programming (ABAP) system also from SAP AG, such as version 7.0. The gateway system 100 can then allow the customer access to the database in the business suite system 104.

Individual users are expected to access the applications 106 using one or more technologies in what is here referred to as an experience platform 108. In some implementations, the experience platform includes one or more web browsers 108A (e.g., Google Chrome, Mozilla Firefox and/or Microsoft Internet Explorer). In some implementations, the experience platform includes one or more mobile devices 108B (e.g., a tablet, smartphone, cellphone and/or another portable computing device). In some implementations, the experience platform includes one or more instances of enterprise software 108C (e.g., implemented using a Microsoft SharePoint platform). In some implementations, the experience platform includes one or more social-media applications 108D (e.g., Facebook or Twitter).

From the experience platform 108 the gateway system 100 can be accessed using HTTP. For example, an HTTP request can be submitted and an HTTP response can be received. In the case of mobile device and security requirements, such communication can be by way of another platform 110, such as a Sybase Unwired Platform.

The gateway client 102 running in the gateway system 100 can generate an HTTP request 112 that is received by the gateway system in analogy with how the HTTP communications from the experience platform 108 would be received. Accordingly, a service in the gateway platform (e.g., an OData service), can be tested without directly using the experience platform.

Figure 2:
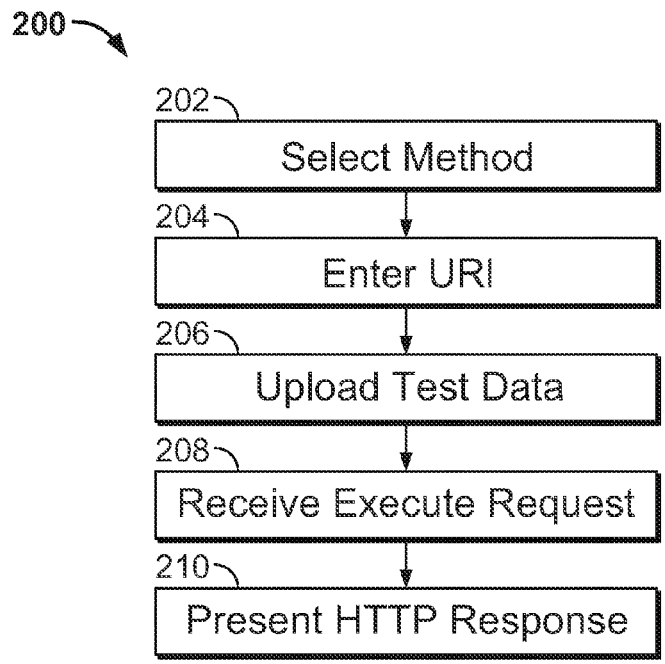
FIG. 2 shows an example of a method for testing an HTTP-communicating service.

FIG. 2 shows an example of a method 200 for testing an HTTP-communicating service. The method 200 can be performed using one or more processors and executable instructions stored in readable media. For example, the method can be performed using the gateway client 102 (FIG. 1). In some implementations, one or more additional steps can be performed. As another example, some steps may be performed in another order.

Figure 3:
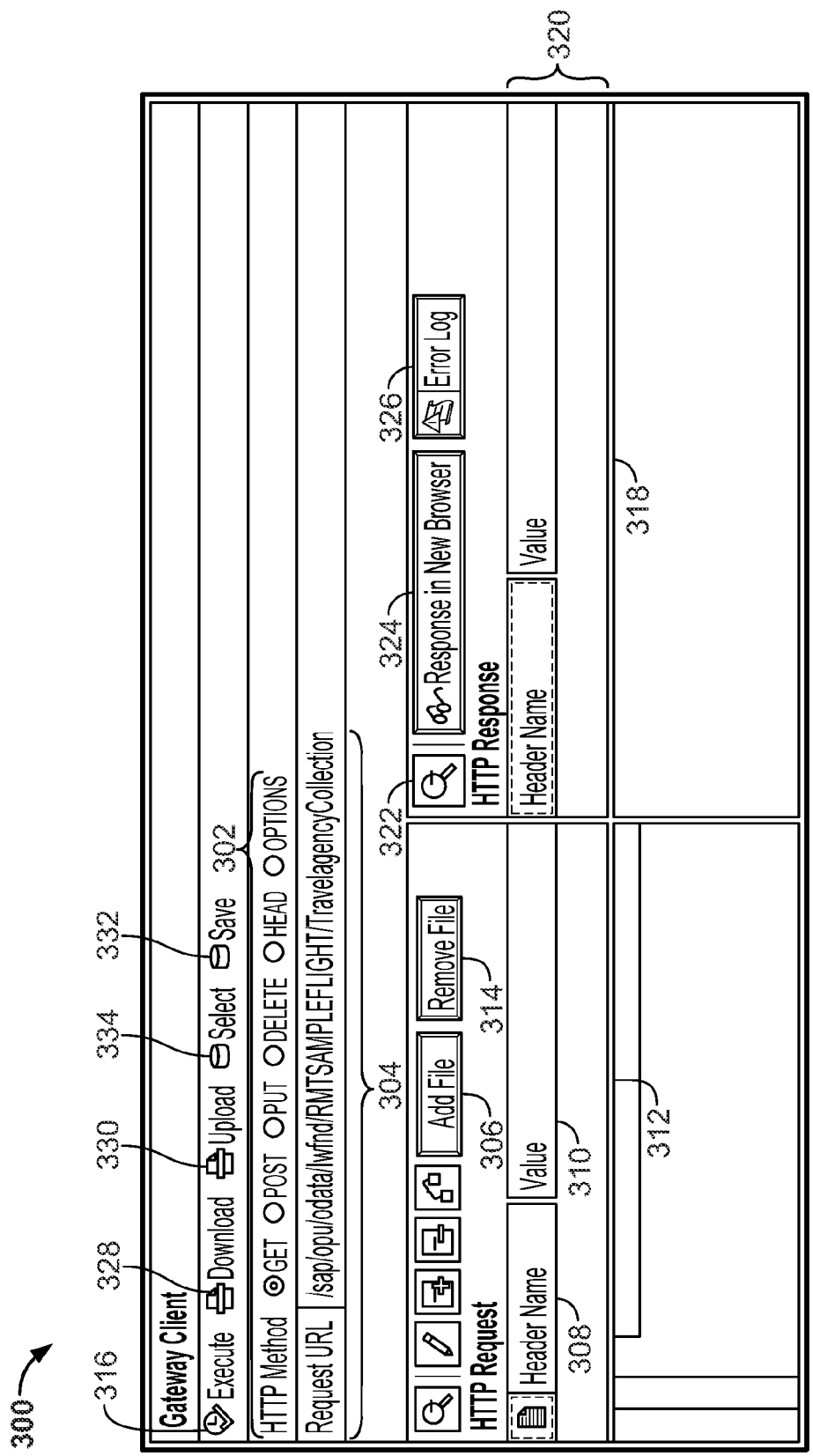
FIG. 3 shows an example of a view generated by a gateway client.

The method 200 will be described with reference to examples shown in other figures. FIG. 3 shows an example of a view 300 generated by a gateway client. At 202, a method is selected. In some implementations, a control 302 allows the user to choose between HTTP methods. For example, a GET method, POST method, PUT method, DELETE method, HEAD method and/or an OPTIONS method can be selected.

At 204, a uniform resource identifier (URI) can be entered. In some implementations, a control 304 allows the user to enter a request URI that the user wants to test. For example, if the request URI does not contain a host name or port number, then the gateway client 102 (FIG. 1) opens a local HTTP connection to the gateway system 100 (FIG. 1; e.g., the SAP NetWeaver Gateway system) where it is running. This can eliminate the need for the user to log in a second time.

As another example, test data can be uploaded at 206. In some implementations, the service data that the user wishes to use can be uploaded by way of an add file control 306.

A header value 308 and value 310 of the HTTP request can be shown in the view 300. For example, this can show a file type, such as .xml, .pdf, or .jpg). A preview area 312 can show a preview of the HTTP request file itself. A remove file control 314 (currently grayed) can be used to remove the file from the HTTP request.

At 208, an execute request is received. For example, the user can activate a control 316 in the view 300 to generate the execute request.

At 210, an HTTP response is presented. In some implementations, the HTTP response can be presented in an HTTP response area 318 of the view 300. For example, if an error arises as a result of the test, the HTTP status and value can be presented in an area 320. Details of the HTTP response can be shown using a control 322; the HTTP response can be presented in a separate browser window using a control 324; or the user can navigate to an error log (e.g., to an SAP NetWeaver Error Log, to correct the error) using a control 326.

A control 328 can be used to upload XML requests from a local device (e.g., a personal computer) to the gateway client 102 (FIG. 1). Vice versa, a control 330 can be used to download XML requests from the gateway client to the local device. In some implementations, all data of an HTTP request will be stored on the local device (e.g., a personal computer) in XML format. For example, the user can save a test case to the local machine using the control 328, and/or restore a test case using the control 330.

The gateway client 102 (FIG. 1) is integrated with an underlying database, such as in the business suite system 104 (FIG. 1). In some implementations, this can provide increased flexibility to access request data already stored in the database for further testing, or to store one's own test cases to the database as required. For example, time and effort can be saved if test cases should be executed more than once. A control 332 can be used to save a request to the database. In some implementations, a dialog box can be shown for entry of more information. For example, the user can specify a test group and a name for the new test case.

A control 334 can be used to select an existing test case from the database. In some implementations, a dialog box can be shown for entry of more information. For example, the user can specify a namespace in which the service sought to be tested resides. For example, in SAP systems the namespace /IWBEP/ and an existing service name, test group or test case, can be entered. If the sought test case does not exist in the database, the user can choose to create it, for example as a default test case.

Figure 4:
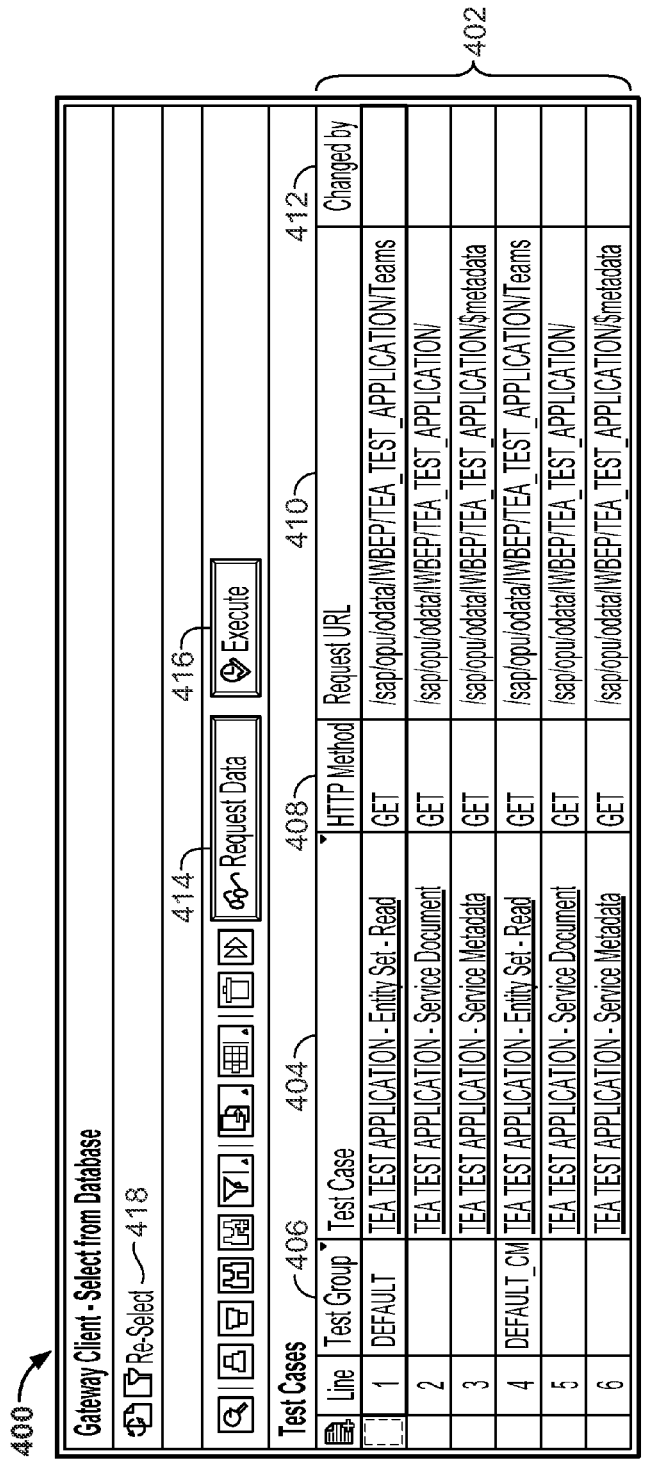
FIG. 4 shows another example of a view generated by a gateway client.

If more than one test case is found based on the user's entry, options can be provided. FIG. 4 shows another example of a view 400 generated by a gateway client. The view 400 includes a list 402 of the matching test cases. Here, the list 402 includes a test case column 404, a test group column 406, an HTTP method column 408, a request URI column 410 and a column 412 listing the user who most recently changed the respective test case. The user can select the line of the test case that is of interest and activate a control 414 to request data. This causes the HTTP request to be displayed. As another example, the user can select the test case and activate a control 416 to execute that particular test case. This causes the test case to be run. Multiple tests can be run in parallel if more than one test case is selected in the list 402. A control 418 can be used to perform another test case selection, for example to enter more, fewer or different search criteria.

Figure 5:
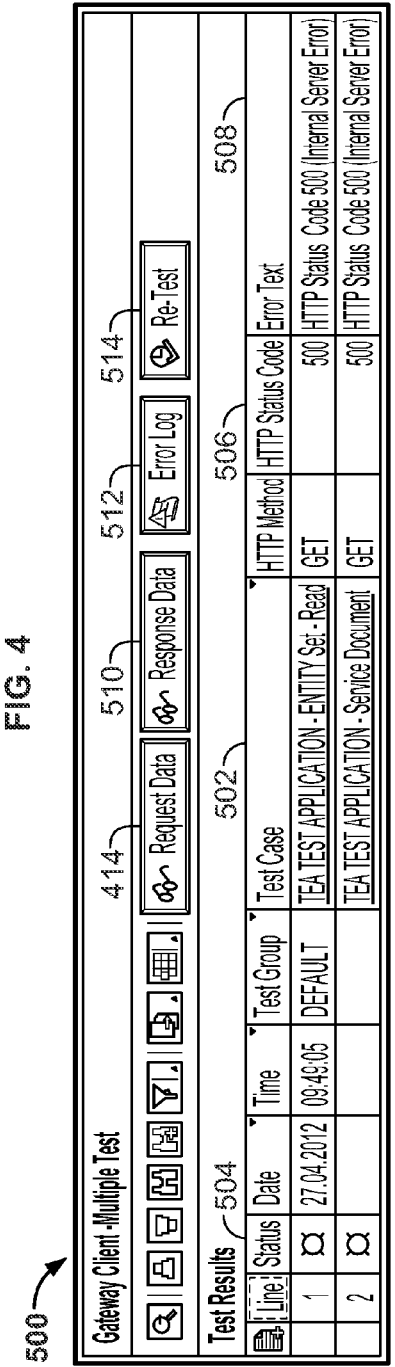
FIG. 5 shows another example of a view generated by a gateway client.

After the test(s) for one or more test cases have been run, results can be presented. FIG. 5 shows another example of a view 500 generated by a gateway client. A column 502 identifies the one or more test cases. A status column 504 indicates the status of the test. Traffic light symbols (e.g., red, yellow or green) can be used for each test case, to name just one example. A column 506 indicates an HTTP status code and a column 508 shows corresponding error text. Here, the control 414 can be used if the user wishes to see the HTTP request. A control 510 can be used if the user wishes to see response data that were provided in response to the HTTP request. For example, the HTTP request and/or the response data can provide more context for the user in interpreting the results.

A control 512 provides access to an error log with which the gateway client 102 (FIG. 1) can be integrated. In some implementations, the error log (e.g., the SAP NetWeaver Error Log) can provide an overview of detailed context information about errors that have occurred at runtime, and it enables the user to navigate to the affected source code. A control 514 can be used if the user wishes to reproduce the exact problem from the error log for analysis. The gateway client 102 (FIG. 1) will then be called with the same data that was sent with the original HTTP request. For example, this allows the user to re-create the exact runtime situation that led to a particular error without having access to the actual HTTP client, such as a mobile application.

Figure 6:
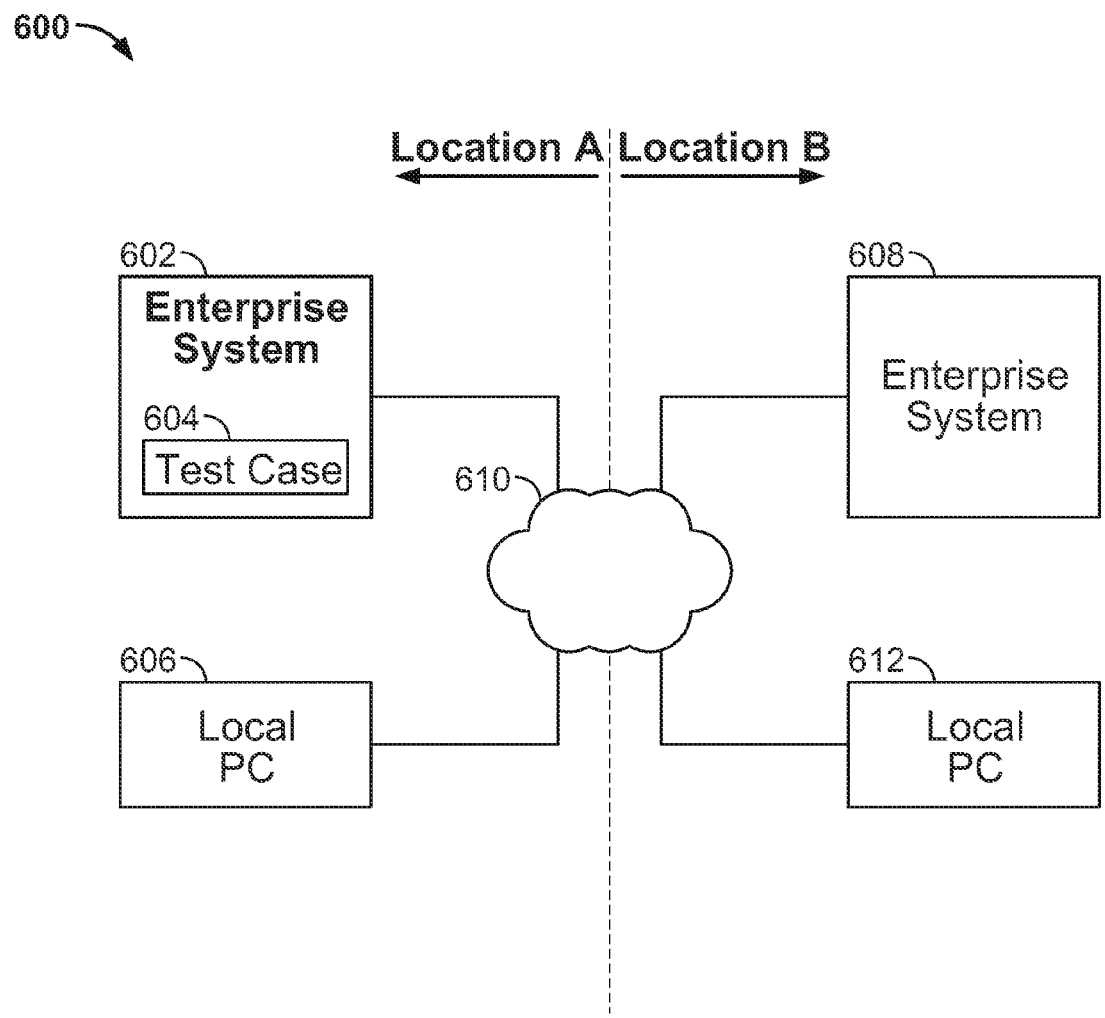
FIG. 6 shows an example system that can be used for sharing a test case.

As noted, a test case can be reused, for example by a different system. FIG. 6 shows an example system 600 that can be used for sharing a test case. The system includes an enterprise system 602 that has stored therein a test case 604. For example, the enterprise system can be the business suite system 104 (FIG. 1) and the test case can be any of the test cases listed in the area 402 (FIG. 4). Moreover, the test case 604 was used for testing a service in the enterprise system using sensitive data, say credit card information. Such data is then stored locally, for example on a local PC 606 operated by the user who launched the test case in the enterprise system. The enterprise system and the local PC are here located at an arbitrary location A.

Assume now that the user wishes to allow someone at another arbitrary location B to run the same test. In some implementations, the tester at location B is also working with and testing the enterprise system 602. In other implementations, the tester is working with a separate (but perhaps equivalent) enterprise system 608 residing at location B. The user in location A can therefore share the test case 604 with the tester at location B, for example through any kind of network 610. However, the test data stored on the local PC 606—in this example sensitive financial information—is not shared with the tester at location B. Rather, at location B the shared test case 604 will be used with separate test data, for example obtained from a local PC 612 that is also at location B.

Figure 7:
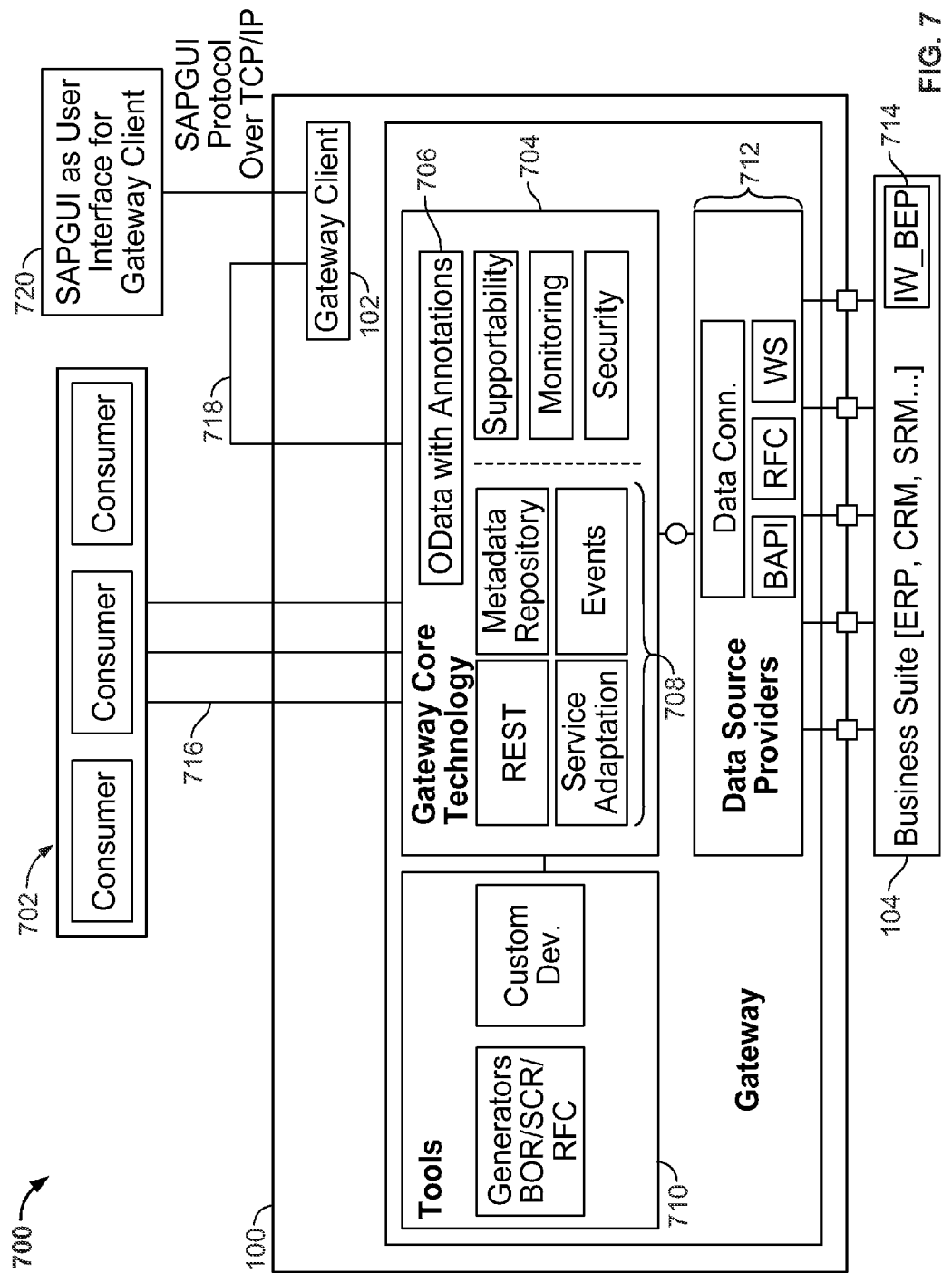
FIG. 7 shows another example of a system.

FIG. 7 shows another example of a system 700. The system 700 includes the gateway system 100 with the gateway client 102, and the business suite system 104. Consumer applications 702 are configured to use services provided through the gateway system 100. In some implementations, such services can be part of core technology 704 in the gateway system. For example, OData with annotations 706 can be included. Services can perform functions regarding supportability, monitoring and security, to name just some examples. The core technology 704 can also make use of additional features 708, such as representational state transfer (REST), a metadata repository, one or more service adaptions, and events. The core technology can operate in connection with tools 710, such as one or more generators or custom developed code. The interaction between the gateway system 100 and the business suite system 104 can involve data source providers 712 in the gateway system. For example, such data source providers can rely on data connectivity, business application programming interfaces (BAPI), RFC, or web services (WS). The business suite system 104 can use a component 714 for interaction with the gateway system 100. For example application coding can be installed on the gateway system, or on the business suite system with proxy object(s) in the gateway system.

The consumers 702 interact with the gateway system 100 through communication channels 716, such as HTTP. Similarly, the gateway client 102 can interact with one or more services to be tested through a corresponding communication channel 718. The gateway client can have a graphical user interface (GUI) 720, such as SAPGUI. In some implementations, the GUI 720 and the gateway client can interact using TCP/IP. For example SAPGUI protocol can be used.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for testing an HTTP-communicating service, the method comprising:
   installing a service in a first system, the first system making the service available to a second system for access using an HTTP request;
   installing a test program in the first system;
   testing the installed service using the test program, wherein the HTTP request is generated by the test program and received by the installed service;
   presenting a result of the testing;
   storing, in the first system, a test case that uses underlying data stored at a local data storage location; and
   providing the test case from the first system to a third system, wherein the third system runs the test case without using the underlying data stored at the local data storage location.

2. The computer-implemented method of claim 1, wherein testing the installed service comprises specifying, in the HTTP request, an HTTP method and a data source, and wherein the installed service is performed using information from the HTTP request.

3. The computer-implemented method of claim 2, wherein specifying the data source comprises identifying the local data storage location.

4. The computer-implemented method of claim 1, wherein testing the installed service comprises reproducing, using the test program, an error situation that was previously detected when the HTTP request was submitted by the second system.

5. The computer-implemented method of claim 1, wherein testing the installed service comprises simulating the installed service.

6. A computer program product tangibly embodied in a computer-readable storage medium and comprising instructions that when executed by a processor perform a method for testing an HTTP-communicating service, the method comprising:
   installing a service in a first system, the first system making the service available to a second system for access using an HTTP request;
   installing a test program in the first system;
   testing the installed service using the test program, wherein the HTTP request is generated by the test program and received by the installed service;
   presenting a result of the testing;
   storing, in the first system, a test case that uses underlying data stored at a local data storage location; and
   providing the test case from the first system to a third system, wherein the third system runs the test case without using the underlying data stored at the local data storage location.

7. The computer program product of claim 6, wherein testing the installed service comprises specifying, in the HTTP request, an HTTP method and a data source, and wherein the installed service is performed using information from the HTTP request.

8. The computer program product of claim 7, wherein specifying the data source comprises identifying the local data storage location.

9. The computer program product of claim 6, wherein testing the installed service comprises reproducing, using the test program, an error situation that was previously detected when the HTTP request was submitted by the second system.

10. The computer program product of claim 6, wherein testing the installed service comprises simulating the installed service.

11. A system comprising:
    one or more processors; and
    a computer program product comprising instructions that when executed cause a method for testing an HTTP-communicating service to be performed, the method comprising:
      installing a service in a first system, the first system making the service available to a second system for access using an HTTP request;
      installing a test program in the first system;
      testing the installed service using the test program, wherein the HTTP request is generated by the test program and received by the installed service;
      presenting a result of the testing;
      storing, in the first system, a test case that uses underlying data stored at a local data storage location; and
      providing the test case from the first system to a third system, wherein the third system runs the test case without using the underlying data stored at the local data storage location.

12. The system of claim 11, wherein testing the installed service comprises specifying, in the HTTP request, an HTTP method and a data source, and wherein the installed service is performed using information from the HTTP request.

13. The system of claim 12, wherein specifying the data source comprises identifying the local data storage location.

14. The system of claim 11, wherein testing the installed service comprises reproducing, using the test program, an error situation that was previously detected when the HTTP request was submitted by the second system.

* * * * *